(12) United States Patent
Parry et al.

(10) Patent No.: US 9,531,807 B2
(45) Date of Patent: Dec. 27, 2016

(54) SAS TOPOLOGY PATHWAY ANALYSIS

(75) Inventors: Owen N. Parry, Colorado Springs, CO (US); Minjen Wang, Colorado Springs, CO (US); Brad Besmer, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1726 days.

(21) Appl. No.: 12/387,275

(22) Filed: Apr. 30, 2009

(65) Prior Publication Data
US 2010/0281172 A1 Nov. 4, 2010

(51) Int. Cl.
*H04L 29/08* (2006.01)
*G06F 3/06* (2006.01)

(52) U.S. Cl.
CPC ........... *H04L 67/1097* (2013.01); *G06F 3/067* (2013.01); *G06F 3/0607* (2013.01); *G06F 3/0635* (2013.01)

(58) Field of Classification Search
CPC ............................ H04L 67/1097; G06F 13/387
USPC .................................................. 709/227–229
See application file for complete search history.

(56) References Cited

U.S. PATENT DOCUMENTS

| 2007/0294572 A1* | 12/2007 | Kalwitz et al. .................. 714/9 |
| 2008/0244100 A1* | 10/2008 | Uddenberg ........... G06F 13/387 710/8 |
| 2008/0244139 A1* | 10/2008 | Nakajima .................... 710/300 |

* cited by examiner

*Primary Examiner* — Jackie Zuniga Abad

(57) ABSTRACT

Methods and systems for configuring network storage are presented.

A method for configuring network storage may include: detecting one more connection rates associated with one or more input PHYs associated with one or more parent devices; detecting a number of input connections associated with one or more PHYs associated with one or more parent devices; setting one or more connection rates associated with one or more input PHYs associated with one or more child devices according to the one or more connection rates associated with the one or more input PHYs associated with the one or more parent devices; and setting a number of input connections associated with one or more PHYs associated with one or more child devices according to a number of input connections associated with one or more PHYs associated with one or more parent devices.

21 Claims, 6 Drawing Sheets

| Device | Max Connection Rate (Gbps) | Max Number of Connections |
|---|---|---|
| SAS 103A-1 | 3 | 1 |
| SAS 103A-2 | 3 | 1 |
| SAS 103A-3 | 6 | 4 |
| SAS 103A-4 | 1.5 | 2 |
| SAS 103A-5 | 3 | 1 |
| SAS 103A-6 | 3 | 4 |
| SATA 103B-1 | 1.5 | 1 |
| SATA 103B-2 | 3 | 1 |
| SAS Expander 104-1 | 6 | 4 |
| SAS Expander 104-12 | 1.5 | 2 |
| SAS Expander 104-13 | 3 | 4 |

FIG. 6

SAS TOPOLOGY PATHWAY ANALYSIS

BACKGROUND

Pathway analysis functionality provided by the inventive system may determine a maximum number of simultaneous connections a Serial Attached SCSI (SAS) initiator may open to an end-device. This may promote an efficient usage of the SAS infrastructure by eliminating connection attempts that may fail due to the system configuration. Determining the maximum number of connections may include: examining a pathway from an initiator to an end-device. Examining the pathway may include examining a number of physical layers (PHYs) and the rates at which they may be connected to each device along a pathway including multiplexing.

SUMMARY

Methods and systems for configuring a storage network are provided.

In one aspect, a method includes but is not limited to: detecting one more connection rates associated with one or more input PHYs associated with one or more parent devices; detecting a number of input connections associated with one or more PHYs associated with one or more parent devices; setting one or more connection rates associated with one or more input PHYs associated with one or more child devices according to the one or more connection rates associated with the one or more input PHYs associated with the one or more parent devices; and setting a number of input connections associated with one or more PHYs associated with one or more child devices according to a number of input connections associated with one or more PHYs associated with one or more parent devices.

In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to: means for detecting one more connection rates associated with one or more input PHYs associated with one or more parent devices; means for detecting a number of input connections associated with one or more PHYs associated with one or more parent devices; means for setting one or more connection rates associated with one or more input PHYs associated with one or more child devices according to the one or more connection rates associated with the one or more input PHYs associated with the one or more parent devices; and means for setting a number of input connections associated with one or more PHYs associated with one or more child devices according to a number of input connections associated with one or more PHYs associated with one or more parent devices.

In addition to the foregoing, other system aspects are described in the claims, drawings, and text forming a part of the present disclosure.

BRIEF DESCRIPTION OF THE FIGURES

FIG. 6 is a table representing the results of the application of a method to the system of FIG. 1.

DETAILED DESCRIPTION

Figure 1:
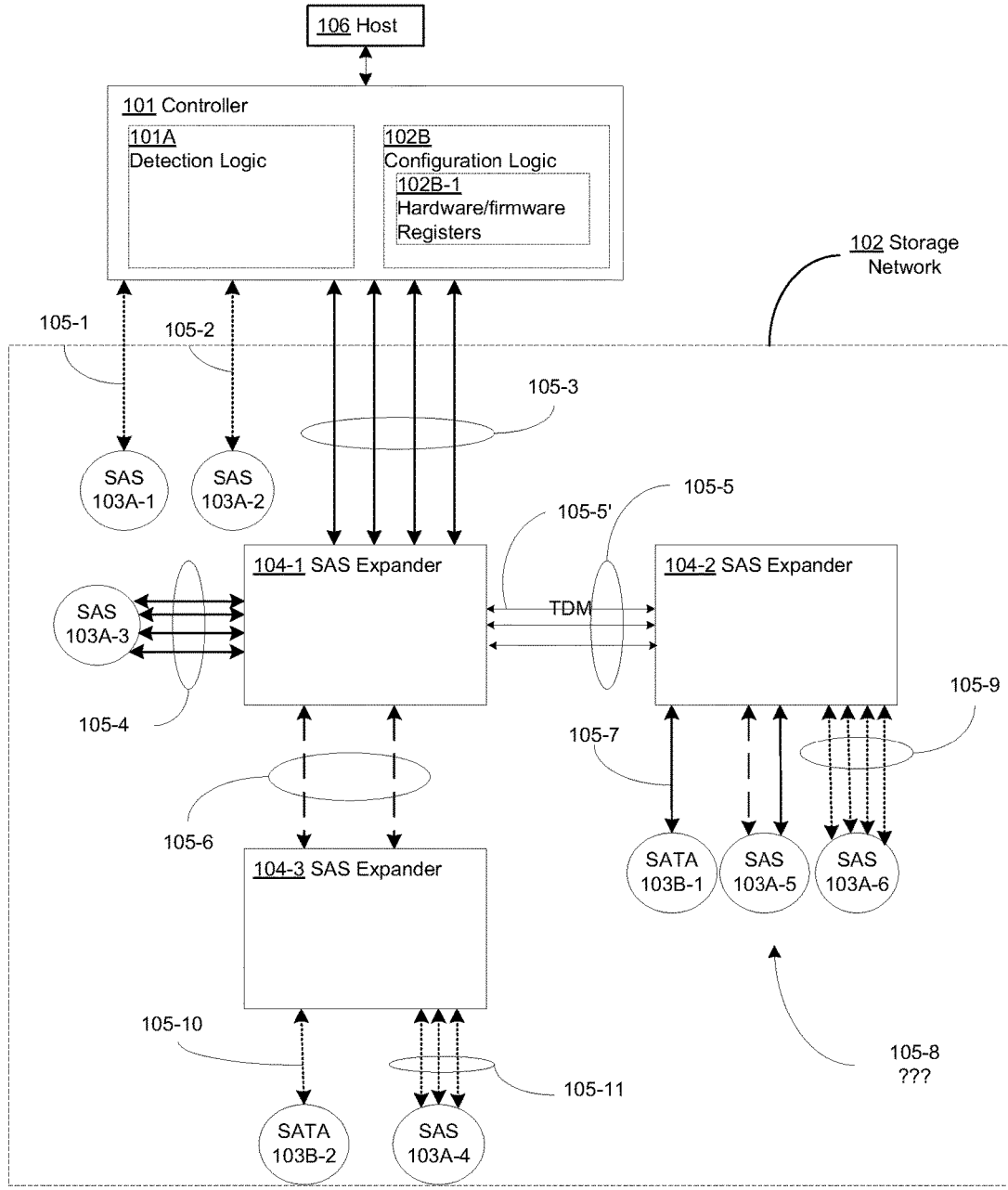
FIG. 1 shows a high-level block diagram of a system for configuring a storage network.
Figure 1:
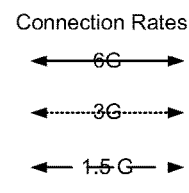

Referring to FIG. 1, a storage system 101 may include a controller device 102 connected to one or more end-devices 103 (e.g. SAS device 103A-1 and SAS device 103A-2). Additional end-devices 103 (e.g. SAS device 103A-3-SAS device 103A-6 and/or SATA device 103B-1-SATA device 103B-2) may be connected to the controller device 102 through the use of expander devices (e.g. SAS expander device 104-1-SAS expander device 104-3). The controller device 102 may include detection logic 102A for detecting the nature of connections between the controller device 102 and an end-device 103 and configuration logic 102B for configuring various hardware and/or software structures (e.g. hardware and/or firmware registers 102B-1) so as to provide the functional characteristics of a storage network 102 to a host device 106.

An SAS expander device 104 (e.g. SAS expander device 104-3) and an end-device 103 (e.g. SAS device 103A-4) may be said to be in a parent-child relationship when data from the controller device 102 must pass through the SAS expander device 104 to reach the end-device 103. Similarly, a first SAS expander device 104 (e.g. SAS expander device 104-1) and a second SAS expander device 104 (e.g. SAS expander device 104-2) may be said to be in a parent-child relationship when data from the controller device 102 must pass through the first SAS expander device 104 to reach the SAS expander device 104. One of skill in the art will recognize that other relationships may exist among devices (e.g. grandparent-grandchild) as determined by a number intervening devices in the network topology. Such devices are herein referred to collectively as "parent" and "child" devices and such device relationships are herein referred to collectively as "parent/child" relationships.

An end-device 103 may be operably coupled to the controller device 102 by one or more physical layer connections (e.g. PHY 105-1-PHY 105-2).

FIG. 1 illustrates an exemplary configuration of the storage network 102. In the storage network 102, a PHY 105 may have an associated connection rate (e.g. 1.5 G, 3.0 G or 6.0 G) and a number of connections (e.g. 1, 2 or 4). It should be noted that a child end-device 103 (e.g. SAS device 103A-4) may have an associated PHY 105 (e.g. PHY 105-11) having a differing connection rate (e.g. 3 G) than a connection rate (e.g. 1.5 G) of a PHY 105 (e.g. PHY 105-6) associated with a parent device (e.g. SAS expander device 104-3). Similarly, a child end-device 103 (e.g. SAS device 103A-4) may have an associated PHY 105 (e.g. PHY 105-11) having a differing number of connections (e.g. 4) than a number of connections (e.g. 2) of a PHY 105 (e.g. PHY 105-6) associated with a parent device (e.g. SAS expander device 104-3).

Following are a series of flowcharts depicting various exemplary implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlierpresented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
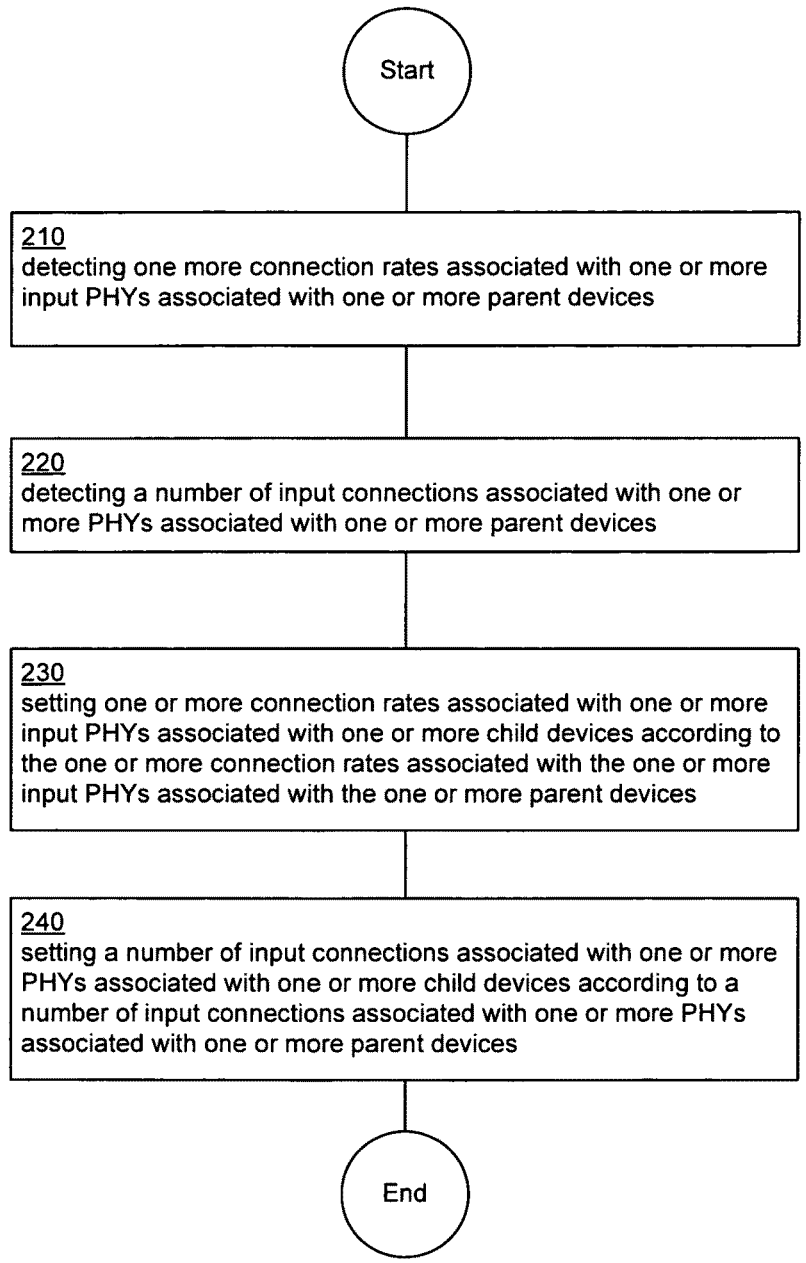
FIG. 2 is a high-level logic flowchart of a process.

FIG. 2 illustrates an operational flow 200 representing example operations related to configuring a storage network. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

After a start operation, the operational flow 200 moves to an operation 210. Operation 210 depicts detecting one more connection rates associated with one or more input PHYs associated with one or more parent devices. For example, as shown in FIG. 1, the detection logic 102A of the controller device 102 may query one or more parent devices (e.g. SAS expander device 104-1) so as to determine the connection rate (e.g. 1.5 G) at which a PHY (e.g. PHY 105-11) associated with the parent device may be transmitting data to a child device (e.g. SAS device 103A-4).

Operation 220 depicts detecting a number of input connections associated with one or more PHYs associated with one or more parent devices. For example, as shown in FIG. 1, the detection logic 102A of the controller device 102 may query one or more parent devices (e.g. SAS expander device 104-1) so as to determine a number of connections (e.g. 2) that a PHY (e.g. PHY 105-11) associated with the parent device may provide to a child device (SAS device 103A-4).

Operation 230 depicts setting one or more connection rates associated with one or more input PHYs associated with one or more child devices according to the one or more connection rates associated with the one or more input PHYs associated with the one or more parent devices. For example, as shown in FIG. 1, even though a child device (e.g. SAS device 103A-4) may have an input PHY (e.g. PHY 105-11) capable of receiving data at a given connection rate (e.g. 3G), it may be the case that a parent device (e.g. SAS expander device 104-3) may have an input PHY (e.g. PHY 105-6) which is only capable of receiving data at a lower connection rate (e.g. 1.5G). As such, the effective connection rate of the child device (e.g. SAS device 103A-4) may never reach its designed connection rate. Upon detection of such a condition by the detection logic 102A, the configuration logic 102B may set one or more hardware and/or firmware registers 102B-1 to reflect the effective connection rate (e.g. 1.5G) of the input PHY (e.g. PHY 105-11) associated with the child device (e.g. SAS device 103A-4). The configuration data maintained by the hardware and/or firmware registers 102B-1 may be provided to a host device 106 so as to present an abstracted view of the effective performance capabilities of the storage network 102.

Operation 240 depicts setting a number of input connections associated with one or more PHYs associated with one or more child devices according to a number of input connections associated with one or more PHYs associated with one or more parent devices. For example, as shown in FIG. 1, even though a child device (e.g. SAS device 103A-4) may have an input PHY (e.g. PHY 105-11) presenting a given connection number of input connections (e.g. 4), it may be the case that a parent device (e.g. SAS expander device 104-3) may have an input PHY (e.g. PHY 105-6) which is only presents a reduced number of input connections (e.g. 2 connections). As such, the effective number of input connections available for the child device (e.g. SAS device 103A-4) may not correspond with its actual number of input connections. Upon detection of such a condition by the detection logic 102A, the configuration logic 102B may set one or more hardware and/or firmware registers 102B-1 to reflect the effective number of input connections (e.g. 2) of the input PHY (e.g. PHY 105-11) associated with the child device (e.g. SAS device 103A-4). The configuration data maintained by the hardware and/or firmware registers 102B-1 may be provided to a host device 106 so as to present an abstracted view of the effective performance capabilities of the storage network 102.

Figure 3:
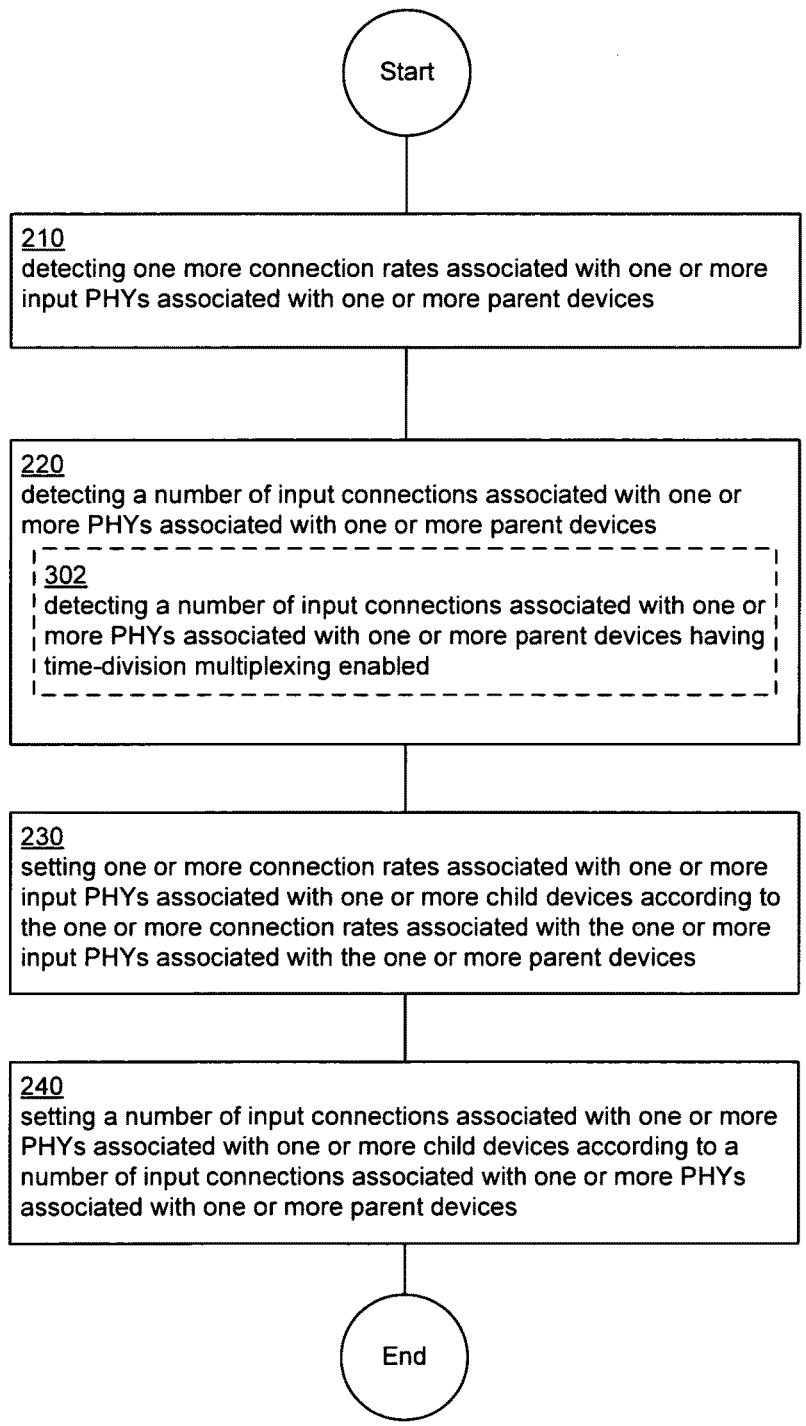
FIG. 3 is a high-level logic flowchart of a process.

FIG. 3 illustrates alternative embodiments of the example operational flow 200 of FIG. 2. FIG. 3 illustrates example embodiments where the operation 220 may include at least one additional operation. Additional operations may include an operation 302.

Operation 302 depicts detecting a number of input connections associated with one or more PHYs associated with one or more parent devices having time-division multiplexing enabled. For example, as shown in FIG. 1, a parent device (e.g. SAS expander device 104-2) may support an input PHY (e.g. PHY 105-5) which includes one or more connections employing time-division multiplexing (TDM). TDM allows two or more signals to be transferred in a single communication channel by transmitting alternating segments of each signal. A channel employing such a methodology may effectively double the number of effective connections viewable by a receiver. The detection logic 102A of the controller device 102 may query one or more parent devices (e.g. SAS expander device 104-2) so as to determine whether or not an associated input PHY (e.g. PHY 105-5) associated with the one or more parent devices employs TDM functionality. Should one or more connections (e.g. connection 105-5' of PHY 105-5) employ TDM, the detection logic 102A of the controller device 102 may associate one or more TDM connections with the PHY 105 in addition to the one or more actual connections of the PHY 105. For example, the detection logic 102A of the controller device 102 may detect 3 actual connections and one TDM connection for PHY 105-5 for a total of 4 connections which may be viewable to an end-device 103.

Figure 4:
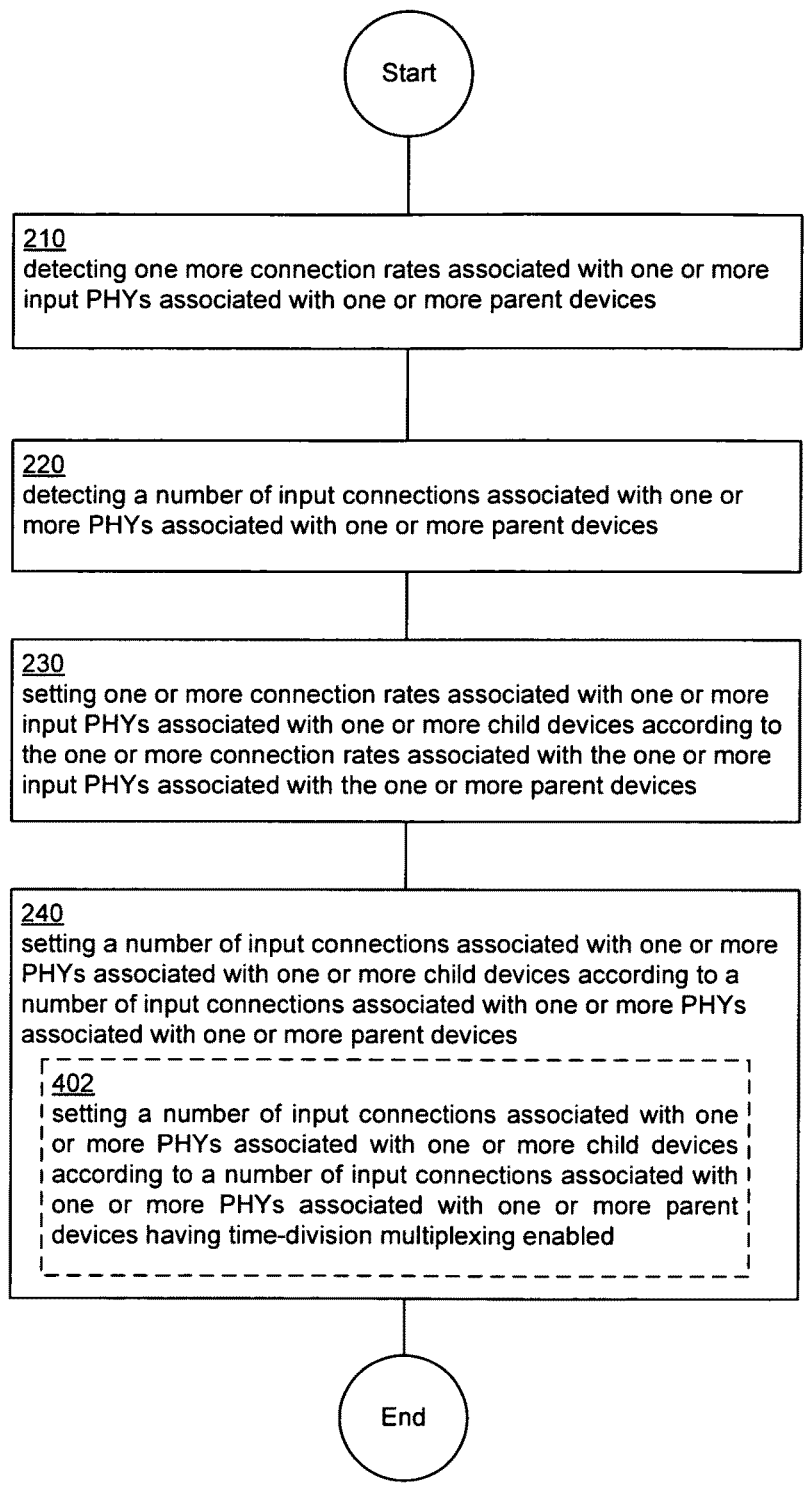
FIG. 4 is a high-level logic flowchart of a process.

FIG. 4 illustrates alternative embodiments of the example operational flow 200 of FIG. 2. FIG. 4 illustrates example embodiments where the operation 240 may include at least one additional operation. Additional operations may include an operation 402.

Operation 402 depicts setting a number of input connections associated with one or more PHYs associated with one or more child devices according to a number of input connections associated with one or more PHYs associated with one or more parent devices having time-division multiplexing enabled. For example, as shown in FIG. 1, even though a child device (e.g. SAS device 103A-6) may have an input PHY (e.g. PHY 105-9) presenting a given connection number of input connections (e.g. 4), it may be the case that a parent device (e.g. SAS expander device 104-2) may have an input PHY (e.g. PHY 105-5) which is only presents a reduced number of input connections (e.g. 3 connections). However, it may also be the case that a parent device (e.g. SAS expander device 104-2) may have an input PHY (e.g. PHY 105-5) employing TDM functionality for one or more connection channels (e.g. connection 105-5'). As such, the effective number of input connections for the child device (e.g. SAS device 103A-6) may still correspond with its actual number of input connections. Upon detection of a parent device (e.g. SAS expander device 104-2) employing TDM by detection logic 102A, the configuration logic 102B may set one or more hardware and/or firmware registers 102B-1 to reflect the effective number of input connections (e.g. 4) of the input PHY (e.g. PHY 105-9) associated with the child device (e.g. SAS device 103A-6). The configuration data maintained by the hardware and/or firmware registers 102B-1 may be provided to a host device 106 so as to present an abstracted view of the effective performance capabilities of the storage network 102.

Figure 5:
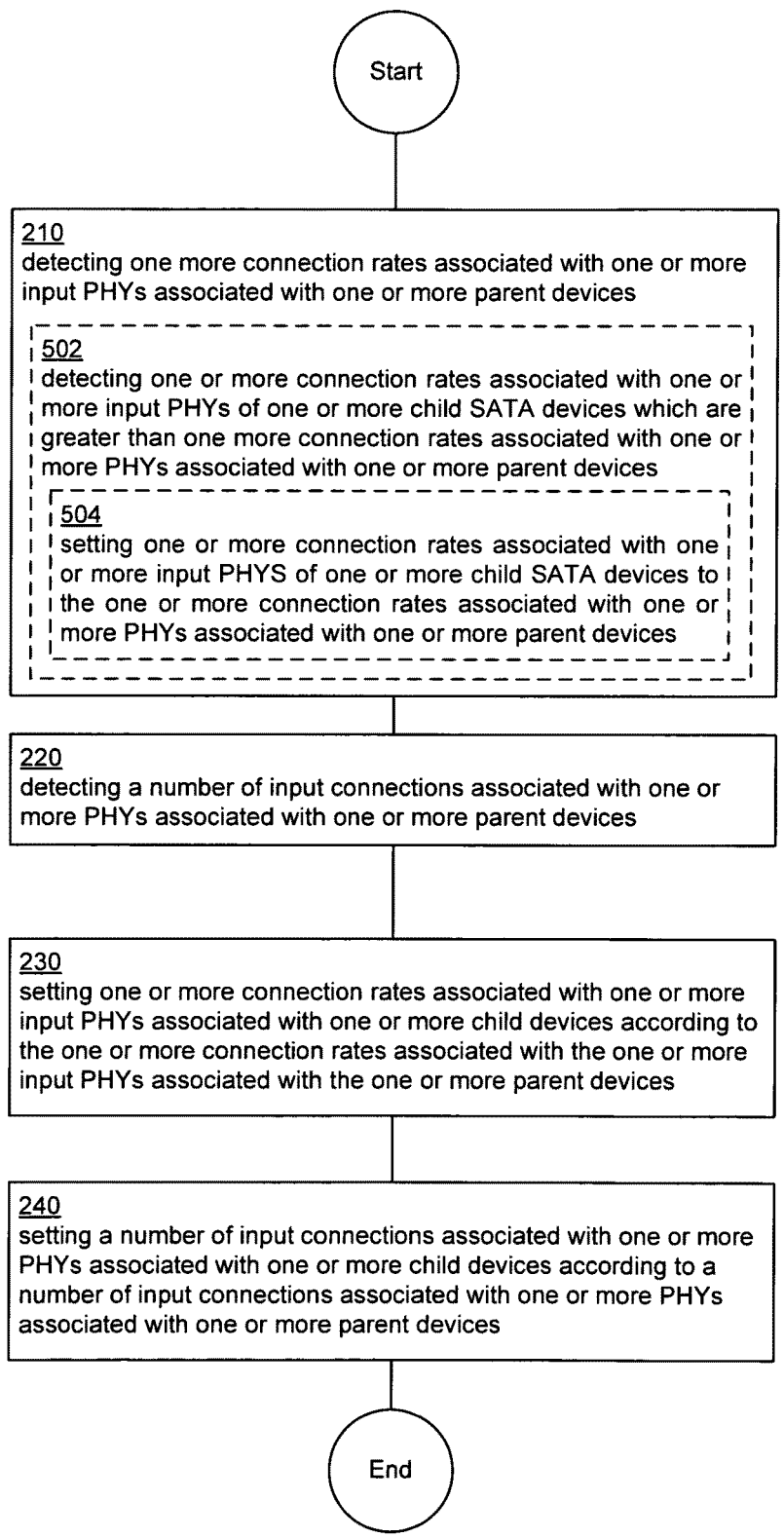
FIG. 5 is a high-level logic flowchart of a process.

FIG. 5 illustrates alternative embodiments of the example operational flow 200 of FIG. 2. FIG. 5 illustrates example embodiments where the operation 210 may include at least one additional operation. Additional operations may include an operation 502 and/or an operation 504.

Operation 502 depicts detecting one or more connection rates associated with one or more input PHYs of one or more child SATA devices which are greater than one more connection rates associated with one or more PHYs associated with one or more parent devices. For example, as shown in FIG. 1, a child end-device 103 may be a Serial ATA (SATA) device employing SAS 1.1 protocols (e.g. SATA device 103B-2). A PHY (e.g. PHY 105-10) having a given connection rate (e.g. 3.0 G) may be associated with the SATA child end-device 103. A parent device (e.g. SAS expander device 104-3) may support an input PHY (e.g. PHY 105-6) having a given connection rate (e.g. 1.5 G) which is less than that of an SATA child end-device 103 (e.g. SATA device 103B-2). Under SAS 1.1 protocols, if an SATA drive is connected to an expander device at a rate greater than what is supported by a parent device in the pathway, it may be necessary to reset the SATA drive via an SMP PHY Control (Link Reset) where the Programmed Maximum Physical Link Rate is set to the pathway rate. As such, the detection logic 102A of the controller device 102 may query one or more parent devices (e.g. SAS expander device 104-2) and one or more SATA child devices (e.g. SATA device 103B-2) so as to determine whether or not an associated input PHY (e.g. PHY 105-6) associated with the one or more parent devices has a connection rate that is less than that of an input PHY (e.g. PHY 105-10) associated with the SATA child device (e.g. SATA device 103B-2).

Operation 504 depicts setting one or more connection rates associated with one or more input PHYS of one or more child SATA devices to the one or more connection rates associated with one or more PHYs associated with one or more parent devices. For example, as shown in FIG. 1, upon detection by the detection logic 102A of the controller device 102 of parent device (e.g. SAS expander device 104-3) which may support an input PHY (e.g. PHY 105-6) having a given connection rate (e.g. 1.5 G) which is less than a connection rate (e.g. 3.0 G) of an SATA child end-device 103 (e.g. SATA device 103B-2), the configuration logic 102B may transmit a SMP PHY Control (Link Reset) command to the SATA child end-device 103 setting the Programmed Maximum Physical Link Rate for the SATA child end-device 103 to the pathway connection rate (e.g. 1.5 G).

Referring to FIG. 6, a table representation of the results (as may be embodied by the hardware and/or firmware registers 102B-1 of the controller device 102) of the above described methods when applied to the network components as presented in FIG. 1. The "Max Connection Rates" values correspond to the effective connection rate for the input PHY 105 associated with each listed component. The "Max Number of Connections" values correspond to the effective number of input connections for the input PHY 105 associated with each listed component.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

The invention claimed is:

1. A method for configuring a storage network comprising:
   detecting one more first connection rates associated with one or more first PHYs associated with one or more parent devices;
   detecting a first number of input connections associated with the one or more first PHYs, the first number of input connections including a subset of input connections having time-division multiplexing enabled;
   setting one or more second connection rates associated with one or more second PHYs associated with one or more child devices according to the one or more first connection rates; and
   setting a second number of input connections associated with the one or more second PHYs according to the first number of input connections such that each input connection in the subset of input connections is represented by two input connections in the second number of input connections.

2. The method of claim 1, wherein the setting one or more second connection rates further comprises:
   storing the one or more connection second rates to one or more registers.

3. The method of claim 1, wherein the setting a second number of input connections further comprises:
   storing the number of second PHYs to one or more registers.

4. The method of claim 1, wherein the detecting one more first connection rates further comprises:
   detecting one or more third connection rates associated with one or more third PHYs of one or more child SATA devices which are greater than the one more first connection rates.

5. The method of claim 4, further comprising:
   setting one or more third connection rates associated with the one or more third to the one or more first connection rates.

6. The method of claim 1, wherein the second number of input connections is an effective number of input connections available from the perspective of an end device.

7. The method of claim 1, wherein the one or more second connection rates are effective connection rates of the one or more second PHYs that are less than actual connection rates of the one or more second PHYs.

8. A system for configuring a storage network comprising:
   detection circuitry to,
      detect one more first connection rates associated with one or more first PHYs associated with one or more parent devices,
      detect a first number of input connections associated with the one or more first PHYs, the first number of input connections including a subset of input connections having time-division multiplexing enabled; and configuration circuitry to,
    set one or more second connection rates associated with one or more second PHYs associated with one or more child devices according to the one or more first connection rates, and
    set a second number of input connections associated with one or more second PHYs according to the first number of input connections such that each input connection in the subset of input connections is represented by two input connections in the second number of input connections.

9. The system of claim 8, wherein the configuration circuitry stores the one or more second connection rates to one or more registers.

10. The system of claim 8, wherein the configuration circuitry stores the second number of input PHYs to one or more registers.

11. The system of claim 8, wherein the detection circuitry detects one or more third connection rates associated with one or more third PHYs of one or more child SATA devices which are greater than the one more first connection rates.

12. The system of claim 11, wherein the configuration circuitry sets the one or more third connection rates to the one or more first connection rates.

13. The system of claim 8, wherein the second number of input connections is an effective number of input connections available from the perspective of an end device.

14. The system of claim 8, wherein the one or more second connection rates are effective connection rates of the one or more second PHYs that are less than actual connection rates of the one or more second PHYs.

15. A non-transitory computer-readable medium comprising computer readable instructions executable by a processor for carrying out a process, the process comprising:
    detecting one more first connection rates associated with one or more first PHYs associated with one or more parent devices;
    detecting a first number of input connections associated with the one or more first PHYs, the first number of input connections including a subset of input connections having time-division multiplexing enabled;
    setting one or more second connection rates associated with one or more second PHYs associated with one or more child devices according to the one or more first connection rates; and
    setting a second number of input connections associated with the one or more second PHYs according to the first number of input connections such that each input connection in the subset of input connections is represented by two input connections in the second number of input connections.

16. The non-transitory computer-readable medium of claim 15, wherein the setting one or more second connection rates further comprises:
    storing the one or more second connection rates to one or more registers.

17. The non-transitory computer-readable medium of claim 15, wherein the setting a second number of input connections further comprises:
    storing the second number of input connections to one or more registers.

18. The non-transitory computer-readable medium of claim 15, wherein the detecting one more first connection rates further comprises:
    detecting one or more third connection rates associated with one or more third PHYs of one or more child SATA devices which are greater than the one more first connection rates.

19. The non-transitory computer-readable medium of claim 18, further comprising:
    setting the one or more third connection rates to the one or more first connection rates.

20. The non-transitory computer-readable medium of claim 15, wherein the second number of input connections is an effective number of input connections available from the perspective of an end device.

21. The non-transitory computer-readable medium of claim 15, wherein the one or more second connection rates are effective connection rates of the one or more second PHYs that are less than actual connection rates of the one or more second PHYs.

* * * * *